(12) United States Patent
Policke et al.

(10) Patent No.: US 8,718,218 B1
(45) Date of Patent: May 6, 2014

(54) SYSTEM AND METHOD FOR THE ANALYSIS OF ONE OR MORE COMPOUNDS AND/OR SPECIES PRODUCED BY A SOLUTION-BASED NUCLEAR REACTOR

(71) Applicant: Babcock & Wilcox Technical Services Group, Inc., Lynchburg, VA (US)

(72) Inventors: Timothy A Policke, Forest, VA (US); Erik T Nygaard, Lynchburg, VA (US)

(73) Assignee: Babcock & Wilcox Technical Services Group, Inc., Lynchburg, VA (US)

( * ) Notice: Subject to any disclaimer, the term of this patent is extended or adjusted under 35 U.S.C. 154(b) by 0 days.

(21) Appl. No.: 13/796,461

(22) Filed: Mar. 12, 2013

(51) Int. Cl.
*G21G 1/00* (2006.01)
*F25J 1/00* (2006.01)
*H01J 49/42* (2006.01)
*B01D 59/44* (2006.01)

(52) U.S. Cl.
USPC .......................... 376/156; 376/356; 376/401

(58) Field of Classification Search
USPC .......................................... 376/156, 356, 401
See application file for complete search history.

(56) References Cited

U.S. PATENT DOCUMENTS

| 4,525,186 A * | 6/1985 | Garwin ............................ 62/639 |
| 8,644,442 B2 * | 2/2014 | Gahl et al. ..................... 376/170 |
| 2013/0251613 A1 * | 9/2013 | Hassan et al. ................. 423/262 |

* cited by examiner

*Primary Examiner* — Nikita Wells
(74) *Attorney, Agent, or Firm* — Eric Marich

(57) ABSTRACT

The present invention relates generally to both a system and method for determining the composition of an off-gas from a solution nuclear reactor (e.g., an Aqueous Homogeneous Reactor (AHR)) and the composition of the fissioning solution from those measurements. In one embodiment, the present invention utilizes at least one quadrupole mass spectrometer (QMS) in a system and/or method designed to determine at least one or more of: (i) the rate of production of at least one gas and/or gas species from a nuclear reactor; (ii) the effect on pH by one or more nitrogen species; (iii) the rate of production of one or more fission gases; and/or (iv) the effect on pH of at least one gas and/or gas species other than one or more nitrogen species from a nuclear reactor.

24 Claims, No Drawings

SYSTEM AND METHOD FOR THE ANALYSIS OF ONE OR MORE COMPOUNDS AND/OR SPECIES PRODUCED BY A SOLUTION-BASED NUCLEAR REACTOR

STATEMENT REGARDING FEDERAL RIGHTS

This invention was made with government support under U.S. Department of Energy Contract No. DE-FC52-09NA29596 awarded by the U.S. Department of Energy. The government has certain rights in the invention.

FIELD AND BACKGROUND OF THE INVENTION

1. Field of the Invention

The present invention relates generally to both a system and method for determining the composition of an off-gas from a solution nuclear reactor (e.g., an Aqueous Homogeneous Reactor (AHR)) and the composition of the fissioning solution from those measurements. In one embodiment, the present invention utilizes at least one quadrupole mass spectrometer (QMS) in a system and/or method designed to determine at least one or more of: (i) the rate of production of at least one gas and/or gas species from a nuclear reactor; (ii) the effect on pH by one or more nitrogen species; (iii) the rate of production of one or more fission gases; and/or (iv) the effect on pH of at least one gas and/or gas species other than one or more nitrogen species from a nuclear reactor. In another embodiment, the present invention utilizes at least one quadrupole mass spectrometer (QMS) in a system and/or method designed to determine in real-time at least one or more of: (i) the rate of production of at least one gas and/or gas species from a nuclear reactor; (ii) the effect on pH by one or more nitrogen species; (iii) the rate of production of one or more fission gases; and/or (iv) the effect on pH of at least one gas and/or gas species other than one or more nitrogen species from a nuclear reactor.

2. Description of the Related Art

Quadrupole mass spectrometers (QMSs) are known in the instrument arts. For example, U.S. Pat. No. 4,039,828 discloses a quadrupole mass spectrometer enclosed by a high vacuum container and including an ionization chamber.

QMSs have been used in conjunction with a variety of advanced technologies. U.S. Pat. No. 5,313,067 utilizes a QMS to aid in ion processing. U.S. Pat. No. 5,411,722 employs a QMS to help homogenize and down-blend highly enriched uranium metal. United States Patent Application Publication No. 2006/0101859 utilizes a QMS to measure the off-gases from glass melting.

Traditional nuclear reactors (heterogeneous nuclear reactors) produce gas in a variety of ways; two important ways are through radiolysis and fissioning. Radiolysis is the decomposition of water by radiation. In traditional nuclear reactors, radiolytic gases are generated by particles with low rates of linear energy transfer (LET) like gamma- and beta-radiation.

In most nuclear reactors, the primary radiolytic gases of interest are hydrogen and oxygen. As is known to those of skill in the art, these gases must be managed by sub-systems within the reactor. One such sub-system may be found in U.S. Pat. No. 3,788,813. Additionally, one or more nitrate compounds can be produced when a nitrate-based fuel is utilized. In the case where one or more nitrate compounds are present, the possibility of nitrate radiolysis occurring is a certainty, thereby yielding one or more nitrogen-bearing gases (e.g., $N_2$, $NO$, $NO_2$, $N_2O$, $HNO_3$, particulate $NO_3^-$, particulate $NH_4^+$, and/or $NH_3$).

Nuclear fission also produces gases directly. Appropriately, these gases are called fission product gases and include, but are not limited to, noble gases, such as xenon (Xe) and krypton (Kr), as well as cesium (Cs) and various iodine (I) species. In heterogeneous reactors, these gases are generally retained by the fuel cladding. However, when fuel cladding fails, these gases escape into the rest of the system. Methods have been developed to detect these leaks (see, e.g., U.S. Pat. No. 3,632,470). These fission gases are fairly easy to detect using radiation detectors. Currently, commercial-off-the-shelf equipment is used to detect these gases both locally and in facility off-gas lines. These methods are routine and common-place throughout the nuclear industry.

Given the above, a need exists in the art for a system and method for determining the composition of the off-gas from a solution nuclear reactor and the composition of the fissioning solution from those measurements.

SUMMARY OF THE INVENTION

The present invention relates generally to both a system and method for determining the components of an off-gas from a solution nuclear reactor (e.g., an Aqueous Homogeneous Reactor (AHR)) and the composition of the fissioning solution from those measurements. In one embodiment, the present invention utilizes at least one quadrupole mass spectrometer (QMS) in a system and/or method designed to determine at least one or more of: (i) the rate of production of at least one gas and/or gas species from a nuclear reactor; (ii) the effect on pH by one or more nitrogen species; (iii) the rate of production of one or more fission gases; and/or (iv) the effect on pH of at least one gas and/or gas species other than one or more nitrogen species from a nuclear reactor. In another embodiment, the present invention utilizes at least one quadrupole mass spectrometer (QMS) in a system and/or method designed to determine in real-time at least one or more of: (i) the rate of production of at least one gas and/or gas species from a nuclear reactor; (ii) the effect on pH by one or more nitrogen species; (iii) the rate of production of one or more fission gases; and/or (iv) the effect on pH of at least one gas and/or gas species other than one or more nitrogen species from a nuclear reactor.

Accordingly, one aspect of the present invention is drawn to a system for detecting at least one quality and/or quantity of at least one off-gas from a solution-based nuclear reactor, the system comprising: at least one gas management system; and at least one quadrupole mass spectrometer, wherein the at least one quadrupole mass spectrometer is located within the at least one gas management system, wherein the at least one quadrupole mass spectrometer determines one or more of the following qualities and/or quantities of a solution-based nuclear reactor: (i) the rate of production of at least one gas and/or gas species from the solution-based nuclear reactor; (ii) the effect on pH by one or more nitrogen species; (iii) the rate of production of one or more fission gases; and/or (iv) the effect on pH by at least one gas and/or gas species other than one or more nitrogen species from a nuclear reactor.

In yet another aspect of the present invention, there is provided a real-time system for detecting at least one quality and/or quantity of at least one off-gas from a solution-based nuclear reactor, the system comprising: at least one gas management system; and at least one quadrupole mass spectrometer, wherein the at least one quadrupole mass spectrometer is located within the at least one gas management system, wherein the at least one quadrupole mass spectrometer determines in real-time one or more of the following qualities and/or quantities of a solution-based nuclear reactor: (i) the rate of production of at least one gas and/or gas species from the solution-based nuclear reactor; (ii) the effect on pH by one or more nitrogen species; (iii) the rate of production of one or more fission gases; and/or (iv) the effect on pH by at least one gas and/or gas species other than one or more nitrogen species from a nuclear reactor.

In yet another aspect of the present invention, there is provided a method for detecting at least one quality and/or quantity of at least one off-gas from a solution-based nuclear reactor, the method comprising the steps of: providing at least one gas management system; providing at least one quadrupole mass spectrometer, wherein the at least one quadrupole mass spectrometer is located within the at least one gas management system; and using the at least one quadrupole mass spectrometer to determine one or more of the following qualities and/or quantities of a solution-based nuclear reactor: (i) the rate of production of at least one gas and/or gas species from the solution-based nuclear reactor; (ii) the effect on pH by one or more nitrogen species; (iii) the rate of production of one or more fission gases; and/or (iv) the effect on pH by at least one gas and/or gas species other than one or more nitrogen species from a nuclear reactor.

In yet another aspect of the present invention, there is provided a real-time method for detecting at least one quality and/or quantity of at least one off-gas from a solution-based nuclear reactor, the method comprising the steps of: providing at least one gas management system; providing at least one quadrupole mass spectrometer, wherein the at least one quadrupole mass spectrometer is located within the at least one gas management system; and using the at least one quadrupole mass spectrometer to determine one or more of the following qualities and/or quantities of a solution-based nuclear reactor: (i) the rate of production of at least one gas and/or gas species from the solution-based nuclear reactor; (ii) the effect on pH by one or more nitrogen species; (iii) the rate of production of one or more fission gases; and/or (iv) the effect on pH by at least one gas and/or gas species other than one or more nitrogen species from a nuclear reactor.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

The present invention relates generally to both a system and method for determining the components of an off-gas from a solution nuclear reactor (e.g., an Aqueous Homogeneous Reactor (AHR)) and the composition of the fissioning solution from those measurements. In one embodiment, the present invention utilizes at least one quadrupole mass spectrometer (QMS) in a system and/or method designed to determine at least one or more of: (i) the rate of production of at least one gas and/or gas species from a nuclear reactor; (ii) the effect on pH by one or more nitrogen species; (iii) the rate of production of one or more fission gases; and/or (iv) the effect on pH of at least one gas and/or gas species other than one or more nitrogen species from a nuclear reactor. In another embodiment, the present invention utilizes at least one quadrupole mass spectrometer (QMS) in a system and/or method designed to determine in real-time at least one or more of: (i) the rate of production of at least one gas and/or gas species from a nuclear reactor; (ii) the effect on pH by one or more nitrogen species; (iii) the rate of production of one or more fission gases; and/or (iv) the effect on pH of at least one gas and/or gas species other than one or more nitrogen species from a nuclear reactor.

While the present invention will be described in terms of an Aqueous Homogeneous Reactor (AHR), the present invention is not limited thereto. Rather, the system and/or method of the present invention can be utilized in connection with any type of nuclear reactor and/or subcritical nuclear system in which one or more of the above-mentioned items need to be determined.

In one embodiment, the present invention is related to a system and/or method that utilizes at least one quadrupole mass spectrometer (QMS) to analyze at least one off-gas of one or more fissioning solution from, for example, an aqueous homogeneous reactor (AHR). Fissioning solutions and AHRs are different from traditional reactors for a variety of reasons. The most significant difference is that the fuel for such reactors is in liquid form. As previously mentioned, in traditional reactors, low linear energy transfer (LET) particles create radiolytic gases. In AHRs, fission products create radiolytic gases. Fission products are high LET particles—meaning they produce much greater quantities of gas per unit power. Furthermore, in AHRs, gaseous fission products are not retained near the fission source as no cladding is present; instead, fission gases are free to escape the fissioning solution via buoyant forces.

To manage these relatively large quantities of radiolytic and fission product gases, specialized reactor gas management systems (RGMSs) are attached to the AHRs or fissioning solution systems. Issued patents regarding AHR technologies usually mention one or more methods to manage these gases (see, e.g., U.S. Pat. Nos. 3,632,470 and 3,573,167). Additionally these same principles are applicable to both sub-critical and critical fissioning systems. Furthermore, the effectiveness of the RGMSs is well known as many AHRs were built and operated in the United States and throughout the world. The effectiveness of the RGMSs is unquestionable; however, unknowns remain regarding the physics and chemistry occurring within AHRs and the subsequent gas stream. In one embodiment, the present invention rectifies and/or quantifies the vast majority of these uncertainties.

The accurate determination of an AHR's fissioning solution (or any type of fissioning solution, critical or sub-critical) and/or an AHR's off-gas stream (or any type of nuclear off-gas stream) has not been accomplished. Although historical attempts have been made in quantifying many parameters like particulate content and activity of various radioactive isotopes, these methods may be classified as rudimentary by today's standards and still leave a number of unknowns that are extremely important to quantify and/or qualify for modern engineers seeking to build AHRs and/or other solution-based fissioning systems.

Some of the most pressing uncertainties related to the physics and chemistry of AHRs are as follows: (i) the rate of production of at least one gas and/or gas species from a nuclear reactor (e.g., radiolytic hydrogen, radiolytic oxygen, Xe, Kr, Cs, I, etc.); (ii) the effect on pH by one or more nitrogen species (e.g., $N_2$, $NO$, $NO_2$, $N_2O$, $HNO_3$, particulate $NO_3^-$, particulate $NH_4^+$, $NH_3$, etc.); (iii) the rate of production of one or more fission gases; and/or (iv) the effect on pH by at least one gas and/or gas species other than one or more nitrogen species from a nuclear reactor. The uncertainties change when different fuel bases (uranyl nitrate versus uranyl sulfate, etc.) or fuels (plutonium versus uranium) are utilized. However, the vast majority of these engineering questions can be answered with a system and/or method according to the present invention where at least one QMS is utilized to determine one or more of the qualities and/or quantities listed above in items (i) through (iv).

In one embodiment, the system and/or method of the present invention incorporates at least one QMS into at least one of a RGMS attached to either: (a) an AHR; (b) another type of solution-based nuclear reactor; and/or (c) a suitable type of fissioning (critical or sub-critical) solution system. The one or more QMSs of the present invention can be incorporated into the system at any point. On suitable non-limiting location for the one or more QMSs is at or near the fissioning solution. However, the present invention is not limited to a specific location (e.g., before a blower, after a blower, before a reheater, etc.) or configuration (e.g., in a shielded cell, unshielded, directional orientation, etc.) within the RGMS for sampling. In one embodiment, any suitable number of QMSs can be utilized in connection with the system and/or method of the present invention. In one embodiment, two or more, three or more, four or more, even five or more QMSs are utilized in connection with the systems and/or methods of the present invention. In another embodiment, one or more QMSs are incorporated in a loop.

In one embodiment, the system and/or method of the present invention is designed to be utilized in connection with a "closed-loop," meaning the sample passed through the QMS is returned to the RGMS. However, in another embodiment, the system and/or method of the present invention can be utilized in connection with an "open-loop," meaning the sample is vented to, for example, one or more off-gas systems and/or holding tanks.

It should be noted that the present invention is not limited to the detection of any specific number of species generated within a fissioning (critical or sub-critical) system. In one embodiment, the present invention is designed to detect at least one (1) species, such as hydrogen gas ($H_2$). In another embodiment, the present invention is designed to detect multiple species, such as hydrogen gas ($H_2$), oxygen gas ($O_2$), nitrogen gas ($N_2$), nitric oxide gas (NO), nitrogen dioxide gas ($NO_2$), nitrous oxide gas ($N_2O$), ammonia gas ($NH_3$), nitric acid ($HNO_3$), particulate $NO_3^-$, particulate $NH_4^+$, etc. In another embodiment, the present invention is designed to detect species that are below about 500 atomic mass units (AMUs, also known as Daltons), below about 450 AMUs, below about 400 AMUs, or even below about 300 AMUs by atomic/molecular mass. Here, as well as elsewhere in the specification and claims, individual numerical values and/or range limits can be combined to form new, additional, and/or undisclosed ranges. Such species can include, but are not limited to, hydrogen gas ($H_2$), oxygen gas ($O_2$), nitrogen gas ($N_2$), nitric oxide gas (NO), nitrogen dioxide gas ($NO_2$), nitrous oxide gas ($N_2O$), ammonia gas ($NH_3$), nitric acid ($HNO_3$), particulate $NO_3^-$, particulate $NH_4^+$, etc.

In another embodiment, the systems and/or methods of the present invention is/are intended to take measurements "on-line" and thusly, the results are provided in "real-time." The results of the real-time sampling can be utilized to provide real-time feedback into other control systems for a solution-based nuclear reactor (e.g., an AHR) and/or any suitable type of solution-based fissioning system. Such feedback can be programmed automatically via analytical correlations, experimental correlations, algorithms, theoretical calculations and/or other methods. Such feedback can also be provided manually by interpreting the results generated by a system and/or method of the present invention. Some possible feedback actions are acid addition, water make-up, and reactor SCRAM. Additionally, the results can be used to calculate important system parameters like solution pH, changes in solution pH, gas generation rates, and gas concentrations in the system, etc.

While not wishing to be bound to any one advantage and/or set of advantages, a system and/or method in accordance with the present invention conveys at least one or more of the following advantages: (A) real-time gas species monitoring; (B) in-line processing of various parameters, such as uranium concentration, acid content, pH, volume, ammonium ($NH_4^+$, for a nitrate system), nitrate ($NO_3^-$, in a nitrate system) content, pressure of a solution-based nuclear reactor; (C) integration with other systems for feedback purposes (e.g., acid addition, water make-up, reactor SCRAM, etc.); (D) calculation of one or more system behaviors from derived calculations, correlations, algorithms, etc. (e.g., solution pH, gas generation rates, gas concentrations in system, etc.) Generally speaking, the advantages associated with a system and/or method of the present invention are derived from the wealth of information that the system and/or method of the present invention provides in a quick and/or real-time manner by the one or more QMSs incorporated therein. This type of detailed information enables a clearer understanding of the physics and chemistry within the AHR and/or solution-based fissioning system.

In another embodiment, the one or more QMSs of the present invention can each be independently replaced by any suitable type of quadrupole mass analyzer. Given this, it should be noted that the term "quadrupole mass spectrometer", "quadrupole mass analyzer", "quadrupole mass discriminator," etc. can be utilized interchangeably with regard to any of the embodiments of the present invention. Suitable QMSs are available from a variety of sources including, but not limited to, Extrel CMS, LLC of Pittsburgh, Pa., USA.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A system for detecting at least one quality and/or quantity of at least one off-gas from a solution-based nuclear reactor, the system comprising:
   at least one gas management system; and
   at least one quadrupole mass spectrometer, wherein the at least one quadrupole mass spectrometer is located within the at least one gas management system,
   wherein the at least one quadrupole mass spectrometer determines one or more of the following qualities and/or quantities of a solution-based nuclear reactor:
   (i) the rate of production of at least one gas and/or gas species from the solution-based nuclear reactor;
   (ii) the effect on pH by one or more nitrogen species;
   (iii) the rate of production of one or more fission gases; and/or
   (iv) the effect on pH by at least one gas and/or gas species other than one or more nitrogen species from a nuclear reactor.

2. The system of claim 1, wherein the at least one gas management system is a closed-loop system.

3. The system of claim 1, wherein the at least one gas management system is an open-loop system.

4. The system of claim 1, wherein the rate of production of at least one of radiolytic hydrogen, radiolytic oxygen, Xe, Kr, Cs, and/or I species is determined.

5. The system of claim 1, wherein the effect on pH by one or more of $N_2$, NO, $NO_2$, $N_2O$, $HNO_3$, particulate $NO_3^-$, particulate $NH_4^+$, and/or $NH_3$ is determined.

6. The system of claim 1, wherein the one or more detected qualities and/or quantities of a solution-based nuclear reactor are utilized to control one or more of:
(A) gas species monitoring;
(B) in-line processing of various parameters of a solution-based nuclear reactor;
(C) integration with other systems for feedback purposes selected from one or more of acid addition, water make-up, reactor SCRAM, or combinations of any two or more thereof; and/or
(D) calculation of one or more system behaviors selected from solution pH, gas generation rates, gas concentrations in system, or combinations thereof from derived calculations, correlations and/or algorithms.

7. A real-time system for detecting at least one quality and/or quantity of at least one off-gas from a solution-based nuclear reactor, the system comprising:
at least one gas management system; and
at least one quadrupole mass spectrometer, wherein the at least one quadrupole mass spectrometer is located within the at least one gas management system,
wherein the at least one quadrupole mass spectrometer determines in real-time one or more of the following qualities and/or quantities of a solution-based nuclear reactor:
(i) the rate of production of at least one gas and/or gas species from the solution-based nuclear reactor;
(ii) the effect on pH by one or more nitrogen species;
(iii) the rate of production of one or more fission gases; and/or
(iv) the effect on pH by at least one gas and/or gas species other than one or more nitrogen species from a nuclear reactor.

8. The system of claim 7, wherein the at least one gas management system is a closed-loop system.

9. The system of claim 7, wherein the at least one gas management system is an open-loop system.

10. The system of claim 7, wherein the rate of production of at least one of radiolytic hydrogen, radiolytic oxygen, Xe, Kr, Cs, and/or I is determined.

11. The system of claim 7, wherein the effect on pH by one or more of $N_2$, NO, $NO_2$, $N_2O$, $HNO_3$, particulate $NO_3^-$, particulate $NH_4^+$, and/or $NH_3$ is determined.

12. The system of claim 7, wherein the one or more detected qualities and/or quantities of a solution-based nuclear reactor are utilized to control one or more of:
(A) gas species monitoring;
(B) in-line processing of various parameters of a solution-based nuclear reactor;
(C) integration with other systems for feedback purposes selected from one or more of acid addition, water make-up, reactor SCRAM, or combinations of any two or more thereof; and/or
(D) calculation of one or more system behaviors selected from solution pH, gas generation rates, gas concentrations in system, or combinations thereof from derived calculations, correlations and/or algorithms.

13. A method for detecting at least one quality and/or quantity of at least one off-gas from a solution-based nuclear reactor, the method comprising the steps of:
providing at least one gas management system;
providing at least one quadrupole mass spectrometer, wherein the at least one quadrupole mass spectrometer is located within the at least one gas management system; and
using the at least one quadrupole mass spectrometer to determine one or more of the following qualities and/or quantities of a solution-based nuclear reactor:
(i) the rate of production of at least one gas and/or gas species from the solution-based nuclear reactor;
(ii) the effect on pH by one or more nitrogen species;
(iii) the rate of production of one or more fission gases; and/or
(iv) the effect on pH by at least one gas and/or gas species other than one or more nitrogen species from a nuclear reactor.

14. The method of claim 13, wherein the at least one gas management system is a closed-loop system.

15. The method of claim 13, wherein the at least one gas management system is an open-loop system.

16. The method of claim 13, wherein the rate of production of at least one of radiolytic hydrogen, radiolytic oxygen, Xe, Kr, Cs, and/or I is determined.

17. The method of claim 13, wherein the effect on pH by one or more of $N_2$, NO, $NO_2$, $N_2O$, $HNO_3$, particulate $NO_3^-$, particulate $NH_4^+$, and/or $NH_3$ is determined.

18. The method of claim 13, wherein the one or more detected qualities and/or quantities of a solution-based nuclear reactor are utilized to control one or more of:
(A) gas species monitoring;
(B) in-line processing of various parameters of a solution-based nuclear reactor;
(C) integration with other systems for feedback purposes selected from one or more of acid addition, water make-up, reactor SCRAM, or combinations of any two or more thereof; and/or
(D) calculation of one or more system behaviors selected from solution pH, gas generation rates, gas concentrations in system, or combinations thereof from derived calculations, correlations and/or algorithms.

19. A real-time method for detecting at least one quality and/or quantity of at least one off-gas from a solution-based nuclear reactor, the method comprising the steps of:
providing at least one gas management system;
providing at least one quadrupole mass spectrometer, wherein the at least one quadrupole mass spectrometer is located within the at least one gas management system; and
using the at least one quadrupole mass spectrometer to determine one or more of the following qualities and/or quantities of a solution-based nuclear reactor:
(i) the rate of production of at least one gas and/or gas species from the solution-based nuclear reactor;
(ii) the effect on pH by one or more nitrogen species;
(iii) the rate of production of one or more fission gases; and/or
(iv) the effect on pH by at least one gas and/or gas species other than one or more nitrogen species from a nuclear reactor.

20. The method of claim 19, wherein the at least one gas management system is a closed-loop system.

21. The method of claim 19, wherein the at least one gas management system is an open-loop system.

22. The method of claim 19, wherein the rate of production of at least one of radiolytic hydrogen, radiolytic oxygen, Xe, Kr, Cs, and/or I is determined.

23. The method of claim 19, wherein the effect on pH by one or more of $N_2$, $NO$, $NO_2$, $N_2O$, $HNO_3$, particulate $NO_3^-$, particulate $NH_4^+$, and/or $NH_3$ is determined.

24. The method of claim 19, wherein the one or more detected qualities and/or quantities of a solution-based nuclear reactor are utilized to control one or more of:
   (A) gas species monitoring;
   (B) in-line processing of various parameters of a solution-based nuclear reactor;
   (C) integration with other systems for feedback purposes selected from one or more of acid addition, water make-up, reactor SCRAM, or combinations of any two or more thereof; and/or
   (D) calculation of one or more system behaviors selected from solution pH, gas generation rates, gas concentrations in system, or combinations thereof from derived calculations, correlations and/or algorithms.

\* \* \* \* \*